(No Model.)
W. H. UNDERWOOD.
DISTRIBUTING TIP FOR LIQUID RECEPTACLES.
No. 378,742. Patented Feb. 28, 1888.
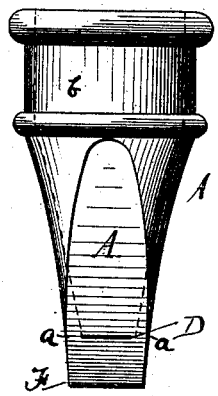
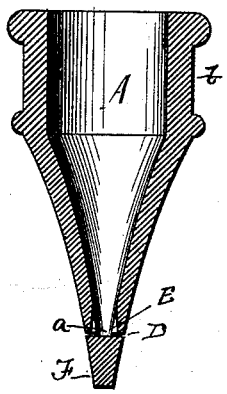
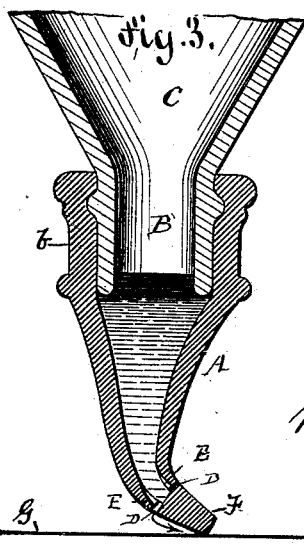
WITNESSES:
INVENTOR
Walter H. Underwood.
BY
Goepel & Raegener
ATTORNEYS

United States Patent Office.

WALTER H. UNDERWOOD, OF DENVER, COLORADO.

DISTRIBUTING-TIP FOR LIQUID-RECEPTACLES.

SPECIFICATION forming part of Letters Patent No. 378,742, dated February 28, 1888.

Application filed April 13, 1887. Serial No. 234,563. (No model.)

*To all whom it may concern:*

Be it known that I, WALTER H. UNDERWOOD, of Denver, Arapahoe county, State of Colorado, have invented certain new and useful Improvements in Distributing - Tips for Liquid-Receptacles, of which the following is a specification.

This invention relates to a cap or tip for mucilage and other liquid receptacles which is designed and adapted to afford a means for closing the receptacle against the admission of air when not in use, and also a means whereby the liquid can be allowed to escape in small quantities and at the same time be spread or distributed over a surface.

The tip, which is of suitable form to fit over or onto the neck or mouth of the receptacle, is made of flexible elastic material, and is formed to provide a spreader for the application of the mucilage or other liquid, and is provided at a suitable point or points with one or more slits which is or are transverse to the spreader, and so arranged as to be normally maintained in a closed condition by the elasticity of the material, and to have its or their sides drawn apart by the spreader when pressure is applied against it, as in the act of applying the liquid to a surface.

As a full understanding of the invention can be best given by an illustration and a detailed description of a tip constructed according to the invention, all further preliminary description will be omitted and a full description given, reference being had to the accompanying drawings, in which—

Figure 1 is a side view of the tip when it is in its normal condition. Fig. 2 is a longitudinal section of the same. Fig. 3 is a view similar to Fig. 2, showing also a part of the liquid-receptacle, and showing the tip bent so as to open one of the slits and allow the contents of the receptacle to escape.

Referring to said figures, it is to be understood that the tip A is hollow, and is made of flexible material, such as india-rubber, and has a base, $b$, of suitable form to fit over or onto the neck B of the receptacle C. The tip thus formed is provided with one or more slits or apertures, D, made without removing any of the material. The location and form of these slits depend upon the relative position of the spreader F, with which the tip is provided, which spreader serves as a means both of opening the slitted apertures D and also of spreading or distributing the liquid. Transverse pressure against the spreader bends the tip and stretches that portion of it which is on the outer or convex side of the bend. A slit made in this portion of it, which is transverse to the line of strain, will be caused to open by such strain. The location and form of the slits or apertures in my device are such that they will be opened by this strain which is applied from the spreader and allow a flow of the liquid at a place convenient for the purposes of the device. The elasticity of the material composing the tip will cause it to resume its normal shape as soon as released from this pressure, thus closing the slitted aperture and preventing the escape of the contents of the receptacle or the admission of air through the tip.

In the construction illustrated the spreader is formed at the extreme end of the tip, it being connected to the main or body portion of the tip by the portions $a$ of the material between the slits. I prefer to gradually decrease the thickness of the material from the base, and especially where the slits are located, as shown at E. The thickness of the lips of the slits is thus reduced, affording less area (or surface) to be gummed together by the drying of the mucilage or other contents than if of greater thickness. The portions $a$ are, as indicated by dotted lines in Fig. 1, preferably made of greater thickness, thus giving additional strength or rigidity to those portions. This strengthening in different parts tends to insure the bending of the tip at the proper point to open the slits, and prevents the tip from buckling or breaking down at any other points which would interfere with the proper opening of the slits. The sides of the tip are preferably flattened, as also indicated—that is to say, the end of the tip is made of greater diameter in one direction than in the other— thereby giving a flat form to the spreader, which facilitates the spreading of the liquid.

The manner of using the distributing-tip thus constructed is as follows: So long as the tip is allowed to remain in its normal condition, as in Figs. 1 and 2, the elasticity of the material will hold the slit or slits D closed, thereby preventing the escape of the liquid or the entrance of air to the receptacle. When it is desired to apply any of the liquid to a surface, as G, the spreader will be pressed transversely against and moved over the surface, as indicated in Fig. 3. This pressure will cause the spreader to draw apart the lips of the slit, thus allowing some of the liquid to escape, and the liquid thus escaping will be spread over the surface by the spreader. As soon as the pressure is removed from the spreader the elasticity of the material will restore it to its normal shape, and thus close the slit. The flexure of the tip tends, to a certain extent, to reduce the combined volume of the receptacle and tip, and thus causes an internal pressure and a consequent flow of the liquid through the slit.

What I claim is—

1. A flexible elastic tip for liquid-receptacles, having a part adapted to operate as a spreader and having a slit or slits transverse to said spreader, substantially as described.

2. A flexible elastic distributing-tip having a closed or solid end and provided on its side or sides with one or more transverse slits, substantially as described.

3. A flexible elastic distributing-tip for liquid-receptacles, provided with a slit, and having the material reduced in thickness at and adjacent to said slit to aid in securing the easy opening thereof, substantially as described.

4. A flexible elastic distributing-tip for liquid-receptacles, having portions of its walls or sides strengthened, substantially as described.

In testimony that I claim the foregoing as my invention I have signed my name in presence of two subscribing witnesses.

WALTER H. UNDERWOOD.

Witnesses:
OSCAR F. GUNZ,
A. W. DODSWORTH.